United States Patent [19]

Sifford

[11] 4,247,944
[45] Jan. 27, 1981

[54] V.29 CONSTELLATION DETECTION METHOD AND APPARATUS

[75] Inventor: Bruce M. Sifford, Los Altos, Calif.
[73] Assignee: Ricoh Co., Ltd., Tokyo, Japan
[21] Appl. No.: 960,851
[22] Filed: Nov. 15, 1978
[51] Int. Cl.³ .............................................. H03D 1/00
[52] U.S. Cl. ........................... 375/94; 340/146.3 AQ; 340/347 DD; 375/42; 364/731
[58] Field of Search ............... 325/30, 320; 178/66 R, 178/67; 364/729, 731; 340/347 DD, 146.3 S, 146.3 T, 146.3 AQ; 329/104; 375/42, 53, 54, 75, 94, 102, 17, 18

[56] References Cited

U.S. PATENT DOCUMENTS

| | | | |
|---|---|---|---|
| 3,588,349 | 6/1971 | Kawai | 178/66 R |
| 3,983,485 | 9/1976 | Stuart | 325/320 |
| 3,988,539 | 10/1976 | Motley et al. | 325/30 |
| 4,037,049 | 7/1977 | Lyon | 375/42 |
| 4,047,153 | 9/1977 | Thirion | 340/146.3 AQ |

Primary Examiner—Benedict V. Safourek
Attorney, Agent, or Firm—Claude A. S. Hamrick

[57] ABSTRACT

V.29 constellation detection method and apparatus including a quadrant transformer for Processing the quantized real and imaginary component signals corresponding to a particular transmitted signal from a known set of transmitted signals by effectively rotating such components into first quadrant position while at the same time developing a quadrant designating signal or tag; a real part quantizer for determining within which of several real part regions the rotated real part component resides; a boundary line intersect selector for dynamically determining the imaginary part limits correspondence to the real part region selected; an imaginary part quantizer for determining within which of several imaginary part regions the rotated imaginary part component resides; and a constellation point selector which in response to the quantized real part, imaginary part information and quadrant information selects one of 16 constellation points as being the signal most likely received.

11 Claims, 6 Drawing Figures

4,247,944

V.29 CONSTELLATION DETECTION METHOD AND APPARATUS

BACKGROUND OF THE INVENTION

1. Field of the Invention

The present invention relates generally to communication signal detection methods and apparatus, and more particularly to an improved method and apparatus for detecting complex signals transmitted with designations according to the V.29 constellation.

2. Description of the Prior Art

One of the ways in which data can be encoded for transmission is to designate an array of data points in a complex plane and then assign each of these points to represent a particular pattern of digital information. These data points can be described by either real and imaginary or phase and amplitude numbers. Each such array of data points is called a constellation and certain constellations have been recognized by CCITT and given designations such as V.27 ter, V.29, etc. Using this type of encoding scheme, the signal received at a receiving station can be related to the points in the constellation and identified with the original information transmitted. Optimum multi-level signal detection theory requires that the constellation signal "closest" to the received signal be selected as the most likely signal transmitted. "Closest" in the complex plane is defined as the constellation point in the set with the shortest magnitude, i.e., $\sqrt{X^2+Y^2}$, to the received signal. If the constellation is defined on a rectangular grid in the complex plane, then the minimum distance can be determined by simple and independent tests on the magnitude of the real and imaginary components of the received signal. If the constellation is arranged in a circular fashion, then the regions are normally defined in terms of polar coordinates rather than quadrature component definitions. If the receiver delivers quadrature components, a rectangular-to-polar transformation must be performed in order to determine the most likely signal transmitted. In the case of the digital detector, this rectangular-to-polar transformation requires a number of computations including multiplication operations which are costly in terms of digital multiplication.

Although there are numerous constellations that have been defined, the V.29 constellation is one that cannot be classified as a pure rectangular or pure angle type of constellation. Hence, an optimum detector for this constellation would normally be expected to be even more complex than detectors used for either the pure rectangular or pure angle type of constellations.

SUMMARY OF THE PRESENT INVENTION

It is therefore a primary object of the present invention to provide a relatively simple method and apparatus for detecting signals transmitted using the V.29 constellation.

Another object of the present invention is to provide a method and apparatus for detecting V.29 constellation encoded signals primarily using simple algebraic tests on the real and imaginary components.

Briefly, a presently preferred embodiment of the present invention includes a quadrant transformer for receiving the real and imaginary component signals corresponding to a transmitted signal and effectively rotating such components into first quadrant position while at the same time developing a quadrant designating signal or tag; a real part quantizer for determining within which of several real part regions the rotated real part component resides; a dynamic boundary line intersect selector for determining the imaginary limits in the real part region selected; an imaginary part quantizer for dynamically determining within which of several imaginary parts regions the rotated imaginary part component resides; and a constellation point selector which in response to the quantized real part, imaginary part information and quadrant information selects one of 16 constellation points as being the signal most likely transmitted.

One advantage of the present invention is that the detector avoids the traditional rectangular-to-polar transformation required for angle type constellations and instead performs primarily simple logical tests on the received data.

Another advantage of the present invention is that the simple logical tests performed are efficiently implemented in a digital implementation of a multi-level signal detector.

Still another advantage of the present invention is that the method and apparatus preserves the optimality and yet simplifies the detection by using basically simple algebraic tests on the real and imaginary received signal components.

These and other objects and advantages of the present invention will no doubt become apparent to those skilled in the art after having read the following detailed description of a preferred embodiment which is illustrated in the several figures of the drawing.

IN THE DRAWING

DETAILED DESCRIPTION OF A PREFERRED EMBODIMENT

Figure 1:
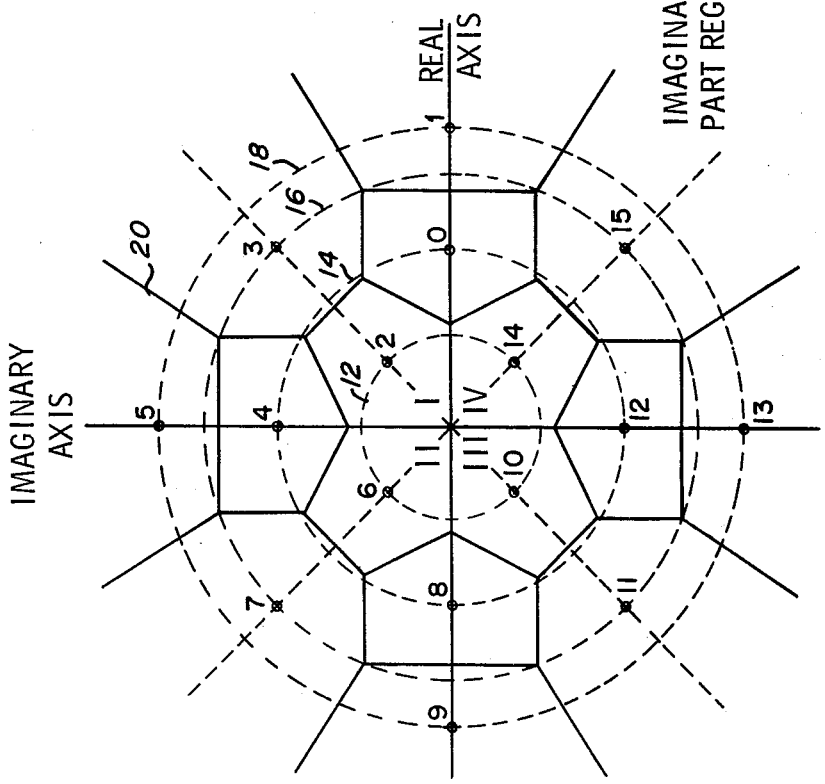
FIG. 1 is a diagram illustrating the V.29 constellation and optimum detector decision domain boundary lines used in accordance with the present invention.

Referring now to FIG. 1 of the drawing, there is shown a complex plane illustration of the four-circle QPSK (V.29 constellation. This particular constellation includes 16 points designated by the numbers 0–15 and arrayed four points on each of four concentric circles 12, 14, 16 and 18. Note that the points in each circle are shifted 45° with respect to the points on the neighboring circles. The lines 20 designate the boundaries of domains within the complex plane surrounding each of the 16 constellation points. A detected point located in the plane and lying within one of the domains will be identified as the constellation point centrally located within that domain.

Figure 2:
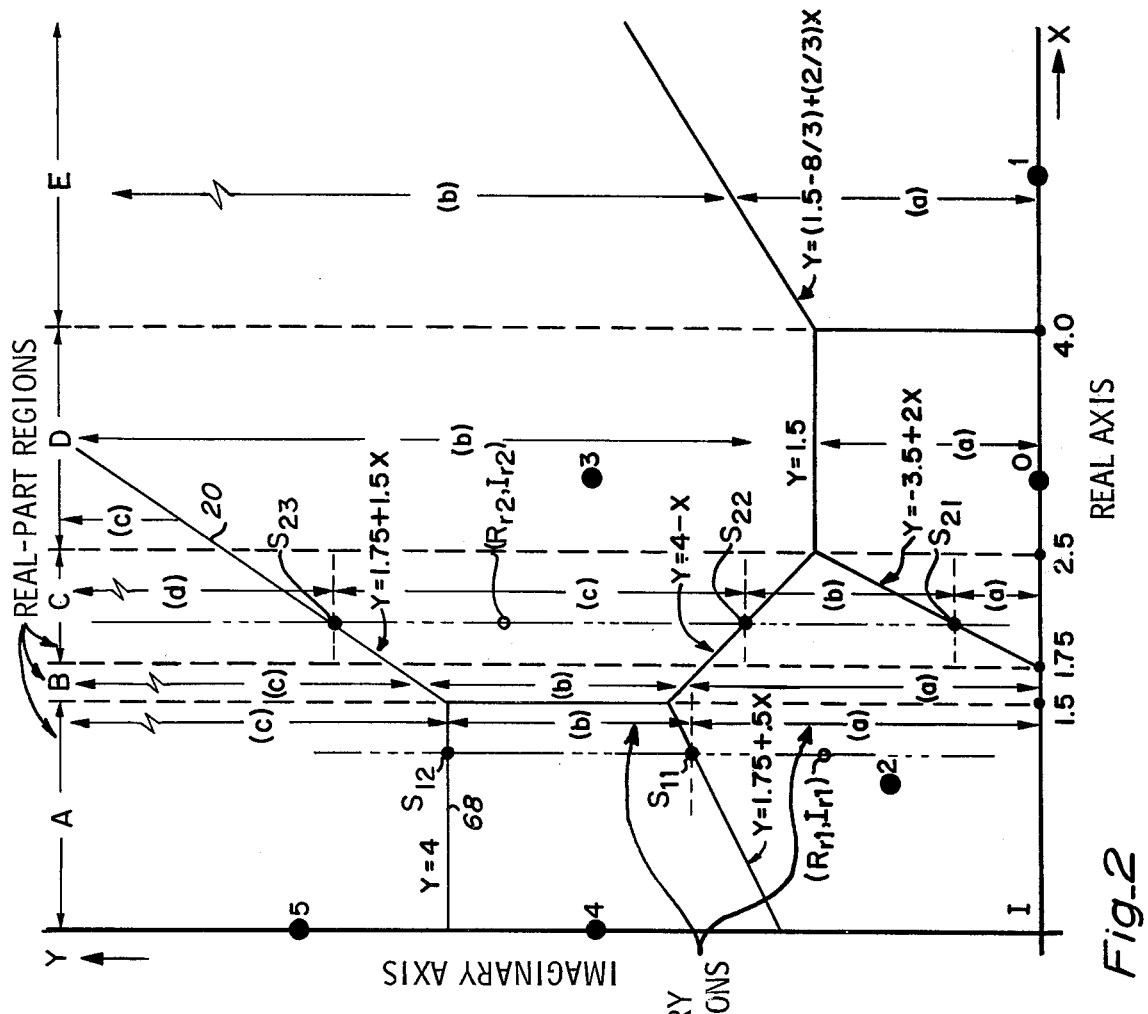
FIG. 2 is a diagram further illustrating the first quadrant of the complex plane shown in FIG. 1 and defining decision limits in accordance with the present invention.

FIG. 2 of the drawing is an enlargement of the first quadrant of the plane illustrated in FIG. 1, with the algebraic equation for each of the nonvertical domain boundary lines 20 being given. In addition, certain real part regions are indicated by the letters A, B, C, D and E. Note that each of the vertically extending limit lines defining a region is coincident with an intersection of three of the domain boundary lines 20. The lower case letters a, b, c and d are used to designate imaginary part boundary regions intersecting the real part regions. Note that whereas the limits of the real part regions are predetermined and fixed, the units of the imaginary part regions are dynamically determined for each set of received data by using the real part component to solve the boundary line equations. As this disclosure proceeds, it will be apparent that by determining the real part region within which a real part component resides and by using the real part component to determine the imaginary part region within which the imaginary part component resides the intersection of these regions can be used to determine the constellation point closest to the received signal.

During each transmission signalling element time, one of the possible 16 complex signals is transmitted to a receiver which receives a replica of this transmitted signal possibly contaminated by additive noise and phase distortions, and separates the received signal into its real and imaginary components. The received signal is normally pre-processed by other circuit components such as filters and equalizers which remove amplitude and phase bias as well as noise and other distortions in the received signal. In accordance with the present invention, a detector then compares the complex components of this equalized signal with those of the points in the V.29 constellation and chooses the constellation point closest to the received point as the actual signal point transmitted.

The detection algorithm is as follows:

1. Rotate the received point in the complex plan in 90° steps until the point lies in the first quadrant; the rotated real part component being designated $R_r$ and the rotated imaginary part component being designated $I_r$.

2. Determine within which of the following real part regions the received point lies:
Region A—$(0 \leq R_r < 1.5)$
Region B—$(1.5 \leq R_r < 1.75)$
Region C—$(1.75 \leq R_r < 2.5)$
Region D—$(2.5 \leq R_r < 4)$
Region E—$(4 \leq R_r)$ 3. Determine the first quadrant constellation point by performing the following tests:

If $R_r$ falls within real part region A and
(a) $I_r < 1.75 + 0.5R_r$, select constellation point 2;
(b) $1.75 + 0.5R_r \leq I_r < 4$, select constellation point 4;
(c) $4 \leq I_r$, select constellation point 5.
If $R_r$ falls within real part region B and
(a) $I_r < 4 - R_r$, select constellation point 2;
(b) $4 - R_r \leq I_r < 1.75 + 1.5R_r$, select constellation point 3;
(c) $1.75 + 1.5R_r \leq I_r$, select constellation point 5.
If $R_r$ falls within real part region C and
(a) $I_r < -3.5 + 2R_r$, select constellation point 0;
(b) $-3.5 + 2R_r \leq I_r < 4 - R_r$, select constellation point 2;
(c) $4 - R_r \leq I_r < 1.75 + 1.5R_r$, select constellation point 3;
(d) $1.75 + 1.5R_r \leq I_r$, select constellation point 5.
If $R_r$ falls within real part region D and
(a) $I_r < 1.5$, select constellation point 0;
(b) $1.5 \leq I_r < 1.75 + 1.5R_r$, select constellation point 3;
(c) $1.75 + 1.5R_r \leq I_r$, select constellation point 5.
If $R_r$ falls within real part region E and
(a) $I_r < (1.5 - 8/3) + (\frac{1}{3})R_r$, select constellation point 1;
(b) $(1.5 - 8/3) + (\frac{1}{3})R_r \leq I_r < 1.75 + 1.5R_r$, select constellation point 3;
(c) $1.75 + 1.5R_r \leq I_r$, select constellation point 5.

4. Rotate the point chosen back into the quadrant in which the point was received and renumber the point according to the constellation point designations shown in FIG. 1.

Figure 3:
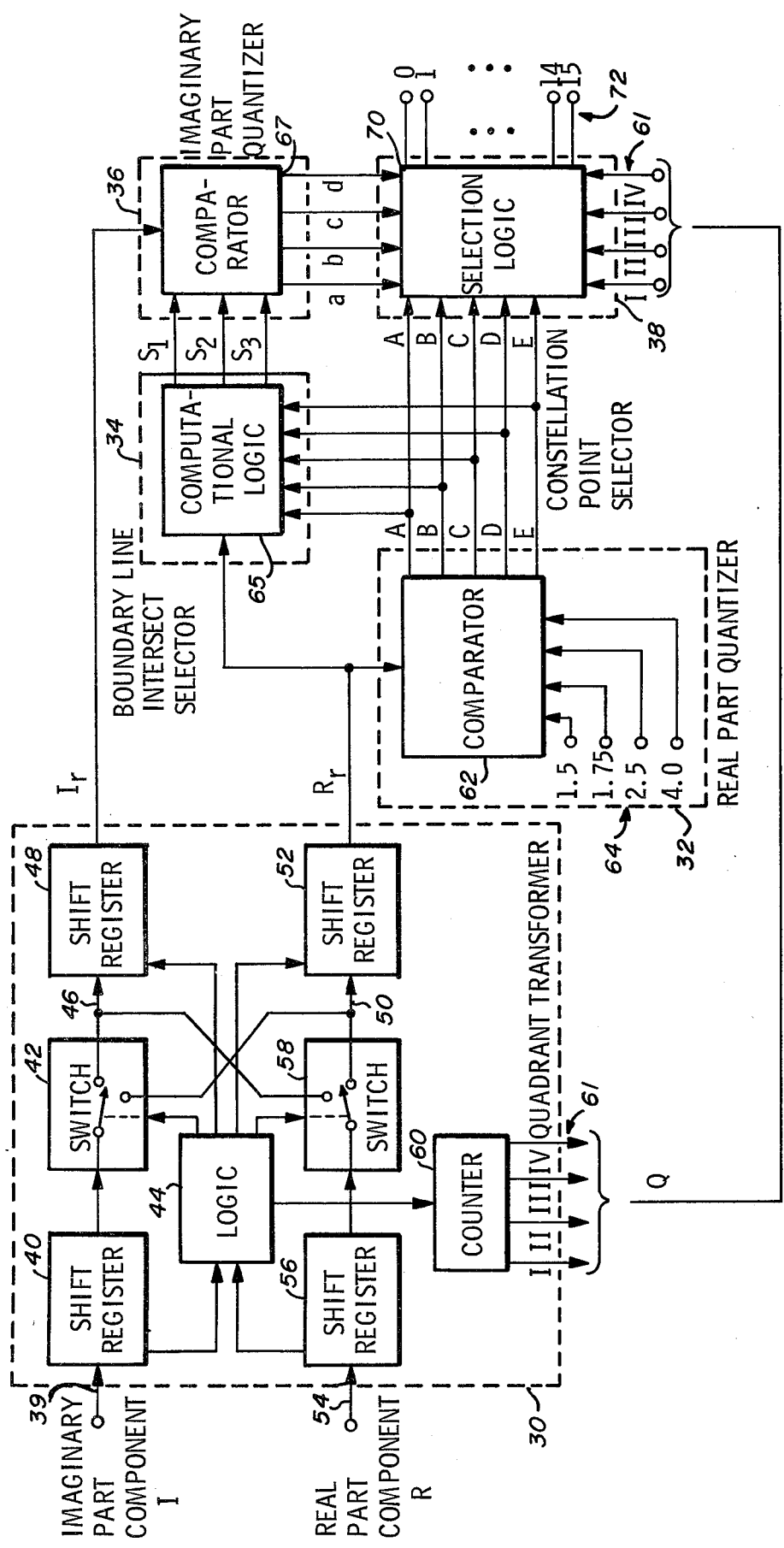
FIG. 3 is a block diagram schematically illustrating the functional components of a detector in accordance with the present invention.

In FIG. 3 of the drawing, there is shown in block diagram form a schematic representation of a V.29 constellation detector in accordance with the present invention. As illustrated by the dashed lines, the detector can be separated into functional components including a quadrant transformer 30, a real part quantizer 32, a boundary line intersect selector 34, an imaginary part quantizer 36, and a constellation point selector 38.

As illustrated, quadrant transformer 30 includes a shift register 40 for receiving an imaginary part component of a received complex signal input at terminal 39. The component signal is in digital form and includes one sign bit and several component magnitude indicating bits. The sign bit is typically assigned the position of the most significant bit. The output of register 40 is coupled to a switching means 42 which for simplicity is schematically shown as a simple two position switch that is controlled by an output from logic circuitry 44 and switches between an input 46 to a shift register 48 and an input 50 to a shift register 52. The real part component signal input at terminal 54 is loaded into a shift register 56, the output of which is coupled by a switch 58 to either the input 46 of shift register 48 or the input 50 of shift register 52. Switch 58 is also controlled by logic circuitry 44.

Logic circuitry 44 determines the states of the sign bits of the imaginary part component and the real part component in the shift registers 40 and 56, respectively, and develops control signals for actuating the switches 42 and 58. The operation of the logic circuitry 44 in this regard is indicated in the table shown in FIG. 4 of the drawing which indicates, for example, that if the sign of the real component stored in register 56 is negative and the sign of the imaginary component stored in register 40 is positive, the detected constellation point will lie in the second quadrant of the complex plane as signified by Q=II. In order to effectively rotate the complex signal into the first quadrant so that further identifying tests can be performed pursuant to the present invention, the real part component in shift register 56 must be transferred into the shift register 48, and the imaginary part component in register 40 must be shifted into the register 52. In addition, since the shifted real part component, which now forms the rotated first quadrant imaginary component $I_r$, has a negative sign bit, logic 44 must also change the state of the sign bit to a positive configuration. An operation similar to this will be performed for each pair of complex signals input to transformer 30.

Logic 44 also provides an output for incrementing a counter 60 that develops an output indicating the quadrant of the received complex signals. Although as implemented in an actual embodiment the output generated by counter 60 might be in the form of digital numbers, for purposes of illustration the output of counter 60 is arbitrarily shown as four output lines 61 each designating one of the quadrants I, II, III and IV.

The rotated real part component $R_r$ residing in register 52 is next input to one side of a comparator 62 of real part quantizer 32 and is compared to each of the four thresholds indicated at 64. Note that these threshold levels correspond to the limits of the real part regions illustrated in FIG. 2. If the magnitude of component $R_r$ is found to lie between 0 and 1.5, a signal will be output on line A; if the component is found to lie between 1.5 and 1.75, a signal will be output on line B, etc. As indicated in FIG. 2, the output of quantizer 32 will designate the real part region within which the received point lies.

The rotated component $R_r$ is also input to the boundary line intersect selector 34 wherein it is used to solve the line equations falling within the real part region selected by quantizer 32. As illustrated schematically in FIG. 5 of the drawing, selector 34 is comprised of computational logic 65 which includes means for solving the line equations for the several boundary lines illustrated in FIG. 2 by simply substituting $R_r$ for X. The real part region signals A–E are used to select one of the computational units.

For example, if a signal appears on line A indicating that a rotated real component $R_{r1}$ lies within real part regions A, then $R_{r1}$ will be substituted for X in the equations $Y=1.75+0.5X$ and $Y=4$ and will yield two solutions $S_{11}$ and $S_{12}$ which uniquely identify the limits of the imaginary part regions a, b and c within the real part region A (FIG. 2). On the other hand, if a rotated real component $R_{r2}$ is found to reside in the areas designated by the region C (FIG. 2) for example, an output will be generated by quantizer 32 on line C (FIG. 3) and the computational logic 65 will substitute the magnitude of the component $R_{r2}$ for X and solve the equations $Y=-3.5+2X$, $Y=4-X$, and $Y=1.75+1.5X$ to provide three solutions $S_{21}$, $S_{22}$ and $S_{23}$ on the lines so designated. These solutions would obviously identify the boundaries of the imaginary part regions a, b, c and d within real part region C.

The imaginary part quantizer 36 includes a comparator 67 which compares the rotated imaginary part component $I_r$ to the Y solutions input thereto by computational logic 65 and determines within which of the regions designated a, b, c or d the imaginary part component resides.

From the above, it will be understood that the intersection of a designated real part region with a designated imaginary part region will uniquely define an area within a particular domain of the first quadrant within which a detected signal falls and will enable selection logic 70 to select one of the first quadrant points 0–5. In addition, selection logic 70 has input to it via the lines 61, quadrant identifying data which enables it to in effect rotate the selected first quadrant point back into its original quadrant and in effect select the appropriate one of the 16 points of the V.29 constellation for output on the lines 72.

Figures 4, 5, 6:
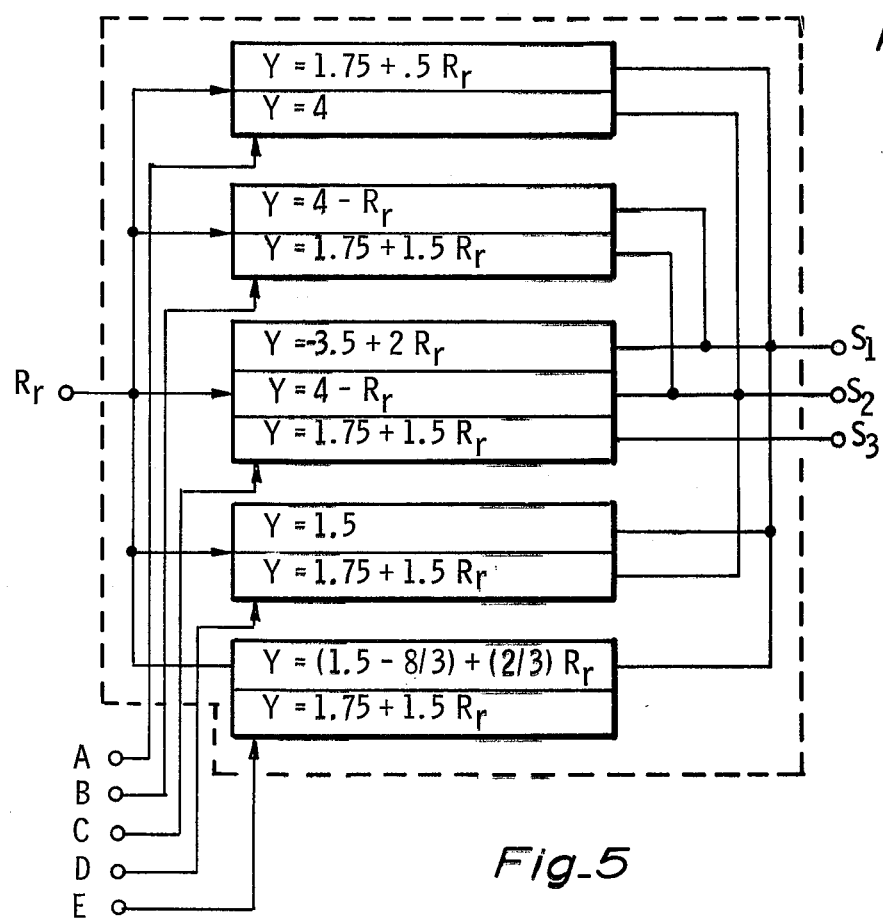
FIG. 4 is a table illustrating the equations for transforming the real and imaginary part components into the first quadrant in accordance with the present invention.
FIG. 5 is a block diagram schematically illustrating the computational logic for the boundary line intersect selector unit shown in FIG. 3.
FIG. 6 is a table designating the first quadrant constellation point to be selected for each identified set of real and imaginary part regions.

In FIG. 6, a table is given that indicates which of the six first quadrant points 0–5 will be selected by logic 70 in response to input of particular pairs of real part region designators (A–E) and imaginary part region designators (a–d). By way of example, if comparator 62 indicates that the received point lies within the real part region B and comparator 67 indicates that the received point lies within the imaginary part region a, then the select first quadrant constellation point would be 2.

Although certain license has been taken in choosing the manner in which the preferred embodiment is illustrated and such showing may perhaps depart from a strictly accurate depiction of actual digital logic paths, it will be appreciated that these diagrams are merely intended to schematically illustrate the functional operations performed on the data as it is passed through the detector. For example, the illustrated signal lines A, B, C, D, E; a, b, c, d, and $S_1$, $S_2$, $S_3$ are not necessarily intended to represent the actual manner in which data is transmitted between the several components. Furthermore, although the output of counter 60 has been shown in terms of four output lines 61, with each being designated by a Roman numeral corresponding to a particular quadrant, it will be appreciated that if the output of counter 60 is in the form of binary numbers such as 0 for first quadrant, 4 for the second quadrant, 8 for the third quadrant, 12 for the fourth quadrant, then such numbers can be directly added, modulo 16, to binary number 0–5 representing selected first quadrant constellation points to produce a binary or other digital representations of the constellation point selected from the integers 0–15, and so forth.

It is also to be understood that even though the disclosed invention has particular applicability to systems transmitting data encoded pursuant to the V.29 constellation configuration, the invention is not necessarily intended to be limited to the detection of data transmitted in such configuration, and it is contemplated that the method disclosed could be modified to accommodate other constellation configurations. Furthermore, it is contemplated that the present invention could be implemented in a programmed computer of microprocessor embodiment. Accordingly, it is intended that the appended claims be interpreted as covering all such implementations, alterations and modifications as fall within the true spirit and scope of the inventions.

What is claimed is:

1. Detector apparatus for selecting from a plurality of constellation signal points arrayed in predetermined domains of a complex plane that signal point which lies closest to the complex plane location of a signal point corresponding to a received signal which has been equalized and converted to complex input signal form, comprising:

quadrant transformation means for rotating the real and imaginary signal point identifying components of the complex input signal from a non-first quadrant location in the complex plane to a corresponding first quadrant location and for generating a rotated real part component signal, a rotated imaginary part component signal, and a quadrant signal indicating the original complex plane quadrant of the input signal;

real part quantizing means responsive to said rotated real part component signal and operative to determine within which of a plurality of predetermined real part regions the rotated real part component signal is located and to develop a real part region signal commensurate therewith;

boundary line intersect selection means responsive to said real part region signal and said rotated real part component signal and operative to generate a plurality of imaginary part boundary solution signals corresponding to points lying along predetermined boundary lines of domains crossed by a real part boundary region;

imaginary part quantizing means responsive to said rotated imaginary part component signal and said imaginary part boundary solution signals and operative to develop an imaginary part region signal; and constellation point selection means responsive to said real part region signal, said imaginary part region signal and said quadrant signal, and operative to develop an output signal corresponding to one of the constellation points.

2. Detector apparatus as recited in claim 1 wherein said real part component signal and said imaginary part component signal each include a magnitude indicating portion and a quadrant indicating portion, and wherein said quadrant transformation means includes logic means responsive to said quadrant indicating portions and operative to convert said component signals into said rotated real part signal and said rotated imaginary part signal.

3. Detector apparatus as recited in claim 2 wherein said quadrant transformation means further includes counter means driven by said logic means and operative to develop said quadrant signal.

4. Detector apparatus as recited in claims 1, 2 or 3 wherein said real part quantizing means includes a comparator for comparing said rotated real part signal to each of a plurality of threshold level signals corresponding to the boundaries of real part regions and for developing said real part region signal as an indicator of within which of said real part regions said rotated real part signal falls.

5. Detector apparatus as recited in claims 1, 2 or 3 wherein said boundary line intersect selection means includes computation logic for determining the imaginary part intersection solutions to the boundary line equations defining the lines dividing said regions and for developing said boundary solution signals commensurate therewith.

6. Detector apparatus as recited in claim 5 wherein said real part quantizing means includes a comparator for comparing said rotated real part signal to each of a plurality of threshold level signals corresponding to the limits of said real part regions and for developing said real part region signal as an indicator of between which of the real part limits said rotated real part signal falls.

7. Detector apparatus as recited in claims 1, 2, 3 or 6 wherein said imaginary part quantizing means includes a comparator for comparing said rotated imaginary part signal to said boundary solution signals and for developing said imaginary part region signal.

8. Detector apparatus as recited in claim 7 wherein said boundary line intersect selection means includes computation logic for determining the imaginary part intersection solutions to the boundary line equations defining the lines separating said domains and for developing said boundary solution signals commensurate therewith.

9. A method for selecting from a plurality of constellation signal points arrayed in predetermined domains of a complex plane that signal point which lies closest to the complex plane location of a point corresponding to a received signal, comprising the steps of:

rotating the received point in the complex plane in 90° steps until the point lies in the first quadrant;

determining within which of a plurality of predetermined real part regions intersecting various ones of said domains, the rotated point resides;

determining within which of a plurality of imaginary part regions intersecting the selected real part region, the rotated point lies;

selecting the first quadrant constellation point lying within the domain in which the intersection of the real part region and the imaginary part region resides;

rotating the selected first quadrant constellation point back into the quadrant from which the rotated received point was originally located; and assigning the rotated constellation point the designation of the point into whose position it was rotated.

10. A method as recited in claim 9 wherein the determination of within which of said real part regions said rotated point lies is made by comparing the real part component of said rotated point to limits associated with each of said real part regions.

11. A method as recited in claims 9 or 10 wherein the determination of within which of said imaginary part regions said rotated point lies is made by solving certain region boundary line equations using the real part component of the rotated point and by comparing the imaginary part component of said rotated point to the solutions.

* * * * *